June 28, 1932.    B. V. E. NORDBERG    1,864,850
ENGINE GOVERNOR
Filed July 20, 1928    3 Sheets-Sheet 1

Inventor
Bruno V. E. Nordberg
By Dodge and Sons
Attorneys

June 28, 1932.  B. V. E. NORDBERG  1,864,850
ENGINE GOVERNOR
Filed July 20, 1928    3 Sheets-Sheet 3

Inventor
Bruno V. E. Nordberg
By
Attorney

Patented June 28, 1932

1,864,850

UNITED STATES PATENT OFFICE

BRUNO V. E. NORDBERG, OF MILWAUKEE, WISCONSIN, ASSIGNOR TO NORDBERG MANUFACTURING COMPANY, OF MILWAUKEE, WISCONSIN, A CORPORATION OF WISCONSIN

ENGINE GOVERNOR

Application filed July 20, 1928. Serial No. 294,157.

This invention relates to engine governors and particularly to compensated governors designed to maintain substantially uniform engine speed throughout the entire range from no load to full load, The present compensator is set into action by departure of the governor from its normal speed to change the mechanical relation between the governor and the device which controls the energy input to the engine. Thus the rate of energy input is corrected before a substantial speed change takes place. It is even technically possible to over-compensate, a condition in which the engine tends to increase its speed with increase of load.

A characteristic of the invention is that the governor has a direct mechanical connection by which it operates the energy input controller. Compensation is effected by a servo-motor set in motion in either direction and in a compensatory degree by departure of the governor from its normal speed position. The direction of motion of the servo-motor is such as to oppose the departure from normal speed, and the servo-motor acts by modifying the direct mechanical connection between the governor and the energy input controller. Thus, in effect the governor has two controlling actions on the input controller, the first an ordinary mechanical connection, and the second a servo-motor connection exerting a modifying effect on the first.

The compensated governor mechanism is applicable generally to prime movers including steam engines and solid injection Diesel engines, but will be described as applied to a Diesel engine of the air injection type in order to develop certain features of peculiar advantage which it offers in combination with this type of engine.

In modern air injection Diesel engines it is the growing practice to control the energy input by conjoint control of the fuel feed and the blast air. Such a method of control is described and claimed in my copending prior application Serial No. 139,943, filed October 6, 1926, and though disclosed at least in part in the present application, is not here claimed except in combination with the compensating mechanism; but is expressly reserved for said prior application. The application above identified has issued since the filing of the present application as Patent 1,721,032, July 16, 1929.

Certain features of the fuel feed mechanism herein disclosed form the subject of and are reserved for a prior copending application Serial No. 269,823, filed April 13, 1928. They are consequently not claimed herein unless in combination with the governor mechanism of the present application.

A peculiar and novel characteristic of the present combination is that while the governor has a direct mechanical connection with the fuel feed control, which connection is subject to modification by the compensator servo-motor under control of the governor; there is no direct mechanical connection from the governor to the blast control; the latter being controlled directly by the servo-motor which in turn is controlled by the governor. The effect is to preserve a primary direct control by the governor, and yet relieve the governor of the load of controlling the blast valve.

The preferred embodiment of the invention will now be described as used with one type of air injection Diesel engine having blast air control. The type of Diesel engine is not material; blast air control can be omitted if desired: many features of the invention are applicable to the control of steam engines, solid injection Diesel engines, and other pressure fluid engines, and to prime movers generally.

In the drawings,—

Fig. 4 is a perspective view of the valve which controls the servo-motor.

Figure 1:
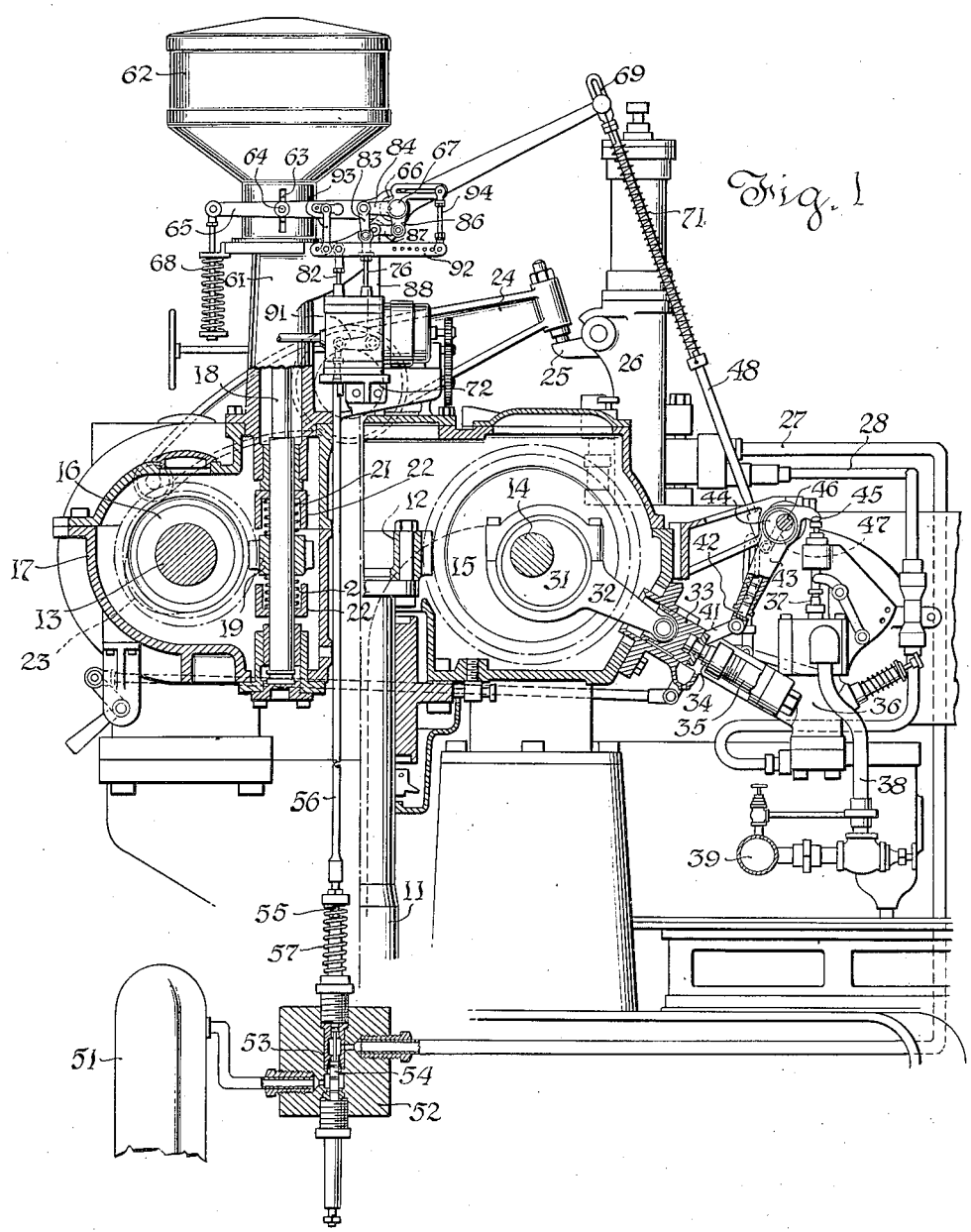
Fig. 1 is a general view largely in vertical section on two different planes showing the upper portion of a vertical air injection Diesel engine with my governor connected to control the fuel feed and blast.

Referring first to Fig. 1, a vertical shaft 11, driven by the engine crank shaft (not shown) drives through a spiral gear 12, the cam shaft 13 and the fuel pump shaft 14. The drive to the pump shaft is through the gear 15, and the drive to the cam shaft is through a similar gear, not visible in the drawings, but fast on the cam shaft 13.

In Fig. 1 the section to the left of the center line of the shaft 11 is taken on a plane forward of the plane on which the remaining section is taken, so that the gear 16 which drives the governor, and the casing 17 therefor, conceal the cam-shaft drive.

The gear 16 is a spiral gear, and drives the governor shaft 18 through a spiral gear 19, which is splined on the shaft 18 and sustained by the springs 21, so as to afford a yielding drive. The springs are sustained by collars 22.

The cam shaft 13 carries a cam 23, which is indicated in dotted lines, and this cam actuates the rocker arm 24. The arm 24 coacts with the rocker 25, depressing the same periodically to open the needle valve of the fuel injection nozzle 26. This nozzle is of the usual form which receives a measured charge of oil from the fuel pump and injects it into the engine cylinder by the flow of high pressure blast air which occurs when the needle valve opens. The blast air connection is shown at 27 and the fuel oil connection at 28.

In the engine chosen for illustration there is a separate fuel pump for each fuel injection nozzle, but only one of the pump units appears in the drawing. Each unit is driven by a corresponding eccentric suitably timed with reference to the cycle of the cylinder which it is connected to feed. One such eccentric appears at 31, with its strap 32 and cross head 33. The pump plunger 34 is connected to the cross head and works in the cylinder 35 which communicates at its head end with the valve chamber in the housing 36. This chamber encloses and guides the inlet and discharge valves.

The discharge valve (not shown) is an ordinary automatic poppet valve in the lower portion of housing 36, and prevents back flow from the fuel oil discharge connection 28. The inlet valve is also an automatic poppet valve, and is mounted in the upper portion of the housing 36 with its stem projecting at 37. It opens automatically to admit fuel oil arriving by branch pipe 38 from the fuel supply manifold 39.

The regulation of the quantity of fuel fed is effected by holding the inlet valve open for variable initial portions of the discharge stroke of the pump plunger. The earlier the inlet valve is allowed to close, the larger the quantity of oil fed to the fuel injecting nozzle. This function is controlled by the governor through the following mechanism:

The cross head 33 carries a bracket 41, to which is pivoted the plunger 42. This telescopes into the arm 43 which is journaled on the eccentric 44. When the cross head reciprocates, the arm 43 is rocked, and the nose 45 on the upper end thereof alternately depresses and releases the stem 37. The parts are so related that at the beginning of the inward stroke of the plunger 34 the inlet valve is held open but immediately commences to close, and the time of closing is determined by the angular position of the shaft 46 on which the eccentric 44 is mounted, for the reason that the position of the eccentric controls the relative position of the nose 45. The angular position of the shaft 46 is controlled by the governor through arm 47 and reach rod 48.

Blast air is furnished by the high pressure air flask 51, at a rate controlled by the governor through its action on the blast regulating valve whose body is indicated at 52. This valve includes a seat 53 having a long and very gradually tapered passage in which the valve head 54 is axially movable. Upward movement of the valve head 54 constricts, but never closes the passage. The valve head 54 is carried by an elongated stem 55 which passes out of the body 52 at both ends, exposing equal areas to blast pressure, so that the valve is balanced as to the fluid pressure. The reach rod 56 by which the valve is actuated connects with the upper end of the stem, and the weight of the valve, stem and reach rod is sustained yieldingly by the spring 57.

The parts so far described conform in part to known practice, and in part to the disclosures in my two prior applications, above identified.

Figure 2:
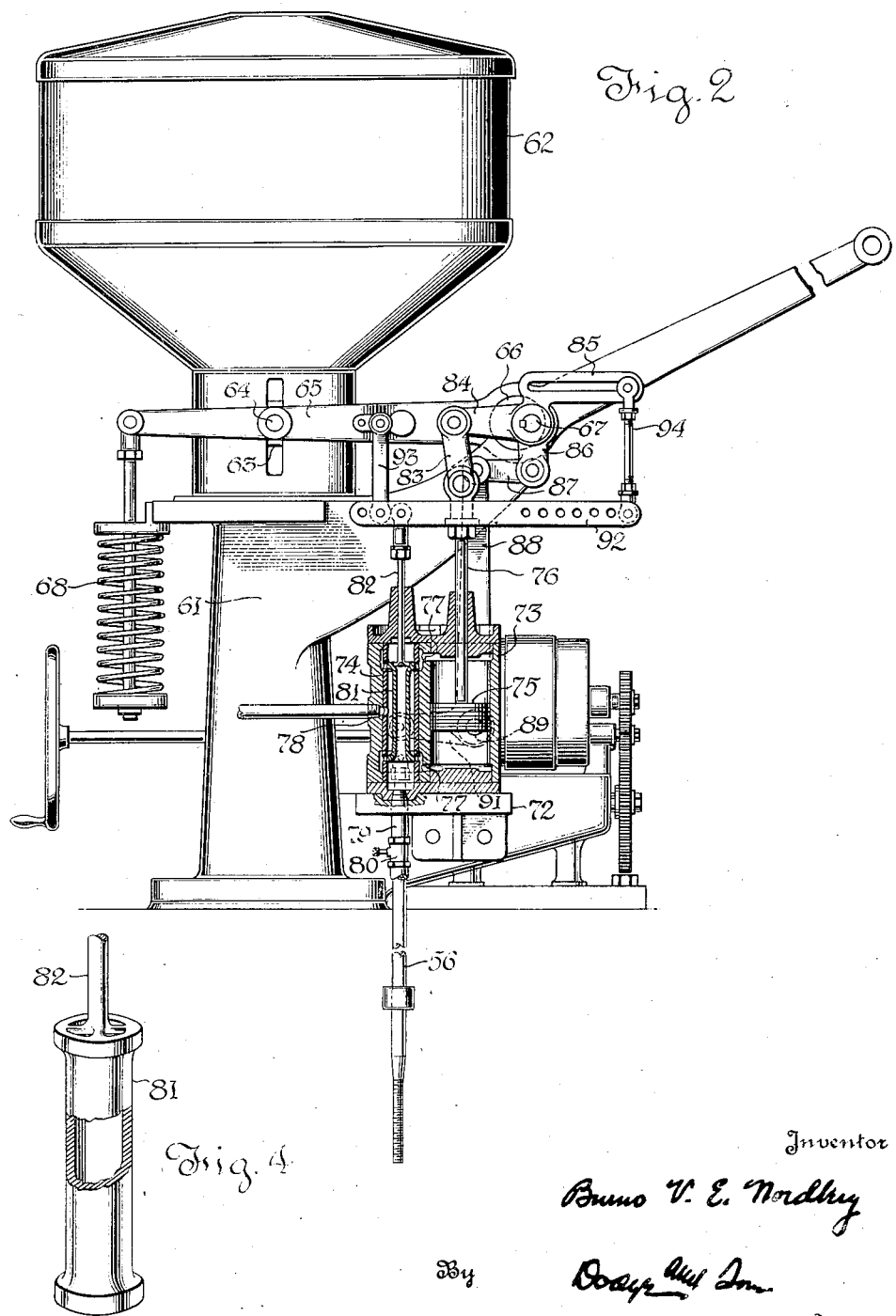
Fig. 2 is an enlarged view of the governor portion of Fig. 1, showing the compensating servo-motor in section.
Figure 3:
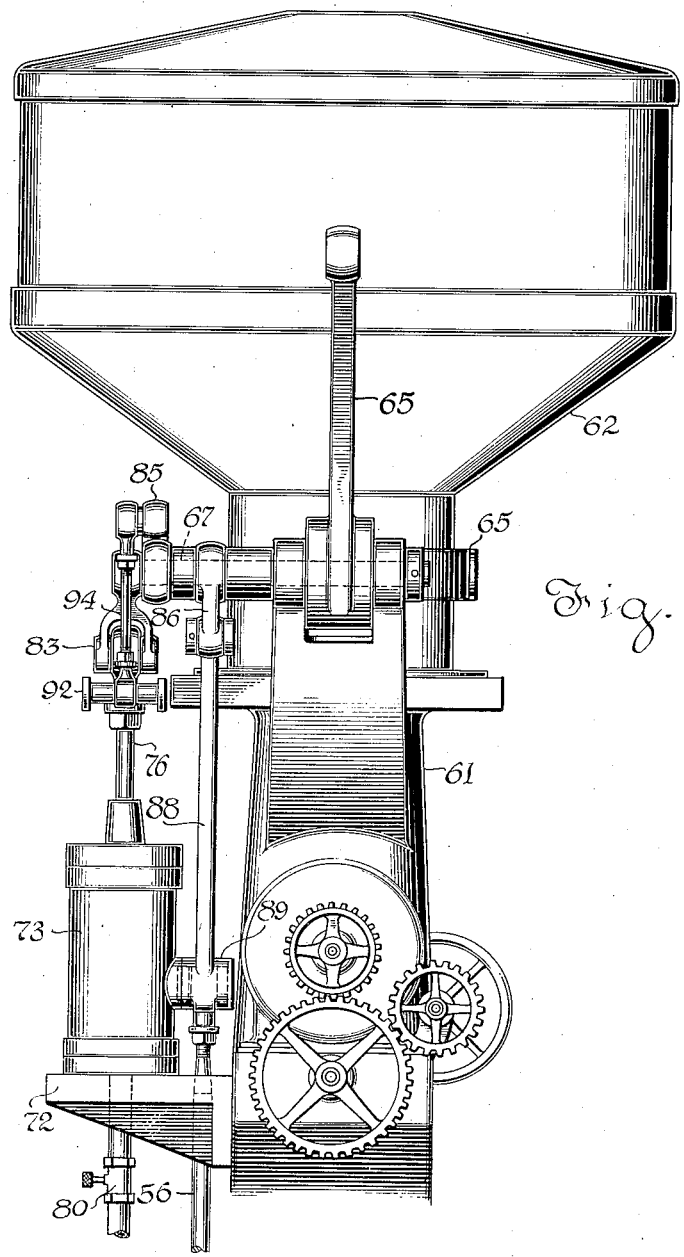
Fig. 3 is an elevation of the governor looking to the left relatively to Fig. 2.

Referring now also to Figs. 2 and 3, the governor shaft 18 extends upward through the governor housing 61, within which it is supported by bearings, and carries at its upper end any suitable centrifugal or other governor, which is here represented merely by the enclosing casing 62, its structure being immaterial. The governor includes the usual collar 63 which rises and falls respectively with increases and decreases of speed. The governor arm 65 is journaled near its midlength on eccentric 66. It is forked near its left end to straddle collar 63 and there carries pins 64 which engage a slot in the collar. The eccentric 66 is keyed on the shaft 67 in such a way that limited rotation of this shaft raises and lowers the eccentric, and hence the axis about which the arm 65 is rocked by the response of the governor to speed variations.

The arm 65 is connected at one end to an ordinary loading spring 68, and at the other end has a pin and slot connection 69 with the reach rod 48, lost motion being normally precluded by the tension spring 71. The purpose of the pin and slot connection is to permit the engine to be stopped by rotating the shaft 46 in a direction to cut off the oil feed. In such manipulation the spring 71 is overpowered.

Mounted on a bracket 72, carried by the housing 61 is the servo-motor unit. This consists of a motor cylinder 73 and a cylindrical valve chamber 74. The motor cylinder contains a double-acting piston 75, with piston rod 76. The valve chamber is bushed and has cylinder ports 77, central pressure fluid supply connection 78 and end exhaust connection 79. The valve 81 is of the balanced piston type with central admission and end exhaust, and is designed with slight and preferably with zero lap on both the admission and exhaust edges. The valve has a longitudinal central bore to permit the exhaust from the upper end to pass longitudinally through the valve 81 to the exhaust connection 79 which is in the lower end of the valve chamber 74, and is controlled by needle valve 80.

The valve 81 is actuated by a stem 82, and it is obvious from the description just given that motion of the valve upward from its lap position causes the piston 75 to move downward and vice versa. Other equivalent valves, many of which are known, may be substituted. Any suitable motive pressure fluid, preferably a liquid, may be used, for example, lubricating oil bled from the pressure lubricating system customarily used in such engines.

The piston rod 76 is connected by a link 83 with one arm 84 of a bell crank which is keyed on the shaft 67. This bell crank also has a slotted horizontal arm 85, and a short pendant arm 86. The pendant arm 86 is connected by a link 87 with the long upstanding arm 88 of a bell crank, which is pivoted at 89 and which has a short horizontal arm 91 connected to the reach rod 56. It follows that motion of the piston 75 adjusts eccentric 66 to shift the fulcrum of the governor arm 65, and changes the setting of the blast controlling valve 54.

The valve stem 82 is pinned to a floating lever 92, one end of which is suspended from arm 65 by a link 93, and the other end of which is suspended from arm 85 by a link 94, which is adjustable in length as indicated in the drawings. The connection of the valve stem 82 to the floating lever 92 is much nearer to the link 93 than it is to the link 94, but the slot in arm 85 and the series of pivot holes clearly shown in the two ends of the floating lever 92 and in the arm 65 permit changes in the pivot points of the linkage to meet any reasonable range of requirements as to the response of the device.

The variable fuel feed is typical of any means for varying the energy input and is the primary control. The blast regulator is typical of secondary controls intended to work in harmony with the primary control.

The parts 52 to 57 inclusive, and the parts 86 to 91, inclusive, may be omitted wherever blast control or some equivalent secondary control is not to be used.

In appropriate cases, other secondary control devices might take the place of the blast regulating valve and be similarly connected with the compensating governor mechanism. In other words, the invention is a governor of general application, and may be generally applied according to requirements with primary control either alone or in combination with a secondary control.

The governor as here embodied and applied acts as follows:

On decrease of speed below the normal rate such as would occur on increase of load, the collar 63 is lowered by the governor. This rocks the lever 65 in a counterclockwise direction. The first effect of this is to rotate the shaft 46 in a clockwise direction slightly raising the eccentric 44 and therefore raising the mean position of the nose 45 so that it allows the inlet valve to close earlier than before with the result that an increased charge of fuel per stroke is fed through the fuel line 28, to the injecting nozzle 26. In a multiple cylinder engine of course each fuel pump is similarly affected.

It will be observed, therefore, that the governor upon a decrease of speed exerts an immediate effect through a direct mechanical connection on the energy input controller, i. e., the valve controlling mechanism of the fuel feed pump.

The motion of the arm 65 just described also acts through the link 93 to lower the floating lever 92 and thus through the stem 82 to lower the valve 81 from its normal lap position. The effect is to admit pressure fluid beneath the piston 75 which immediately moves upward at a rate determined by the setting of needle valve 80, turning the shaft 67 in a clockwise direction. Thus motion is conveyed to the valve 81 in reduced degree through the arm 85, link 94 and floating lever 92, but the immediate effect is to raise the eccentric 66 thus raising the right hand end of the lever 65 and accentuating the tendency of the governor to feed more fuel to the engine, thus increasing the speed of the engine. The effect is to rearrange the relation between the governor and the fuel feeding mechanism in such a way that the fuel feed is increased to meet the load while the governor returns to its normal mean speed position.

In engines equipped with blast control or with any secondary control, the motion of the shaft 67 through the arm 86 swings the arm 88 to the left. Consequently the arm 91 is lowered, moving the valve 54 downward and slightly increasing the supply of blast air to the fuel injecting nozzle 26.

It will be observed that when the governor returns to the normal speed position, the valve 81 will move back substantially to its normal or lap position and that the relation of the supporting links to the floating link 92 can be made such that the fuel feed compensation will give the desired characteristics. The adjustments afforded permit the attainment of almost precise compensation so that the engine runs at substantially constant speed under all loads, but it is practicable, and is within the scope of the present invention, to slightly under-compensate or even to slightly over-compensate. When over-compensating is practiced, the engine speed would actually increase with increase in load.

The needle valve 80 is to control the rate of flow from and hence the rate of motion of the servo-motor. It thus introduces an important timing factor conductive to precise action and the elimination of hunting. In effect it controls the rate of flow of motive liquid to, as well as from, the motor, and other locations accomplishing this result are obviously possible.

What is claimed is,—

1. The combination of a prime mover having an energy input regulating means; a speed responsive governor driven by the prime mover; a connection through which said governor actuates said regulating means, said connection being mounted on an eccentric displaceable to vary the relation of the regulating means to the governor; a reversible motor connected to displace said eccentric; means for controlling the reverse movements of the motor; and a floating lever connected to actuate said controlling means and operatively connected with said governor and with said eccentric.

2. The combination of a prime mover having a primary energy input regulating means, and a secondary regulating means operable independently of said primary means; a speed responsive governor driven by the prime mover; a connection through which said governor actuates said primary regulating means, said connection having a part displaceable to vary the relation of the primary regulating means to the governor; a reversible motor; connections from said motor to said displaceable part and to said secondary regulating means; means for controlling the reverse movements of said motor; and a motion combining connection between the governor and the motor on the one hand and the last named controlling means on the other.

3. The combination of a prime mover having a primary energy input regulating means, and a secondary regulating means operable in consonance with said primary means; a speed responsive governor driven by the prime mover; a connection through which said governor actuates said primary regulating means, said connection having a part displaceable to modify the relation of the regulating means to the governor; a pressure motor; connections from the pressure motor to said displaceable part and to said secondary regulating means; a valve for controlling said pressure motor; and a motion combining connection between the governor and motor on the one hand and the valve on the other.

4. The combination of an air injection Diesel engine; a speed responsive governor driven thereby; means for controlling the amount of fuel fed to the engine for each operative cycle; means for controlling the rate of feed of fuel-injecting air; an operative connection between the governor and the fuel controlling means, said connection including a member movable to change the relation of the fuel controlling means to the governor; a reversible motor; connections from said motor to said member and to the air controlling means; controlling means for said motor; and a motion combining connection between the governor and the motor on the one hand, and the motor-controlling means on the other.

5. The combination of an air injection Diesel engine having independent means to vary the rate of fuel feed and the rate of supply of fuel-injecting air; a speed responsive governor driven by said engine; an adjustable actuating connection between the governor and the fuel rate varying means; a motor connected to adjust said connection and to actuate said air-varying means; and a controller for said motor subject to conjoint actuation by the governor and by the motor itself.

6. The combination of a prime mover having a primary energy input regulating means, and a secondary regulating means operable independently of said primary means; a speed responsive governor driven by the prime mover; a linkage having a shiftable fulcrum, said linkage connecting said governor with said primary regulating means; a reversible motor; connections from said motor to said shiftable fulcrum and to said secondary regulating means; means for controlling the reverse movements of said motor; and a motion combining connection between the governor and the motor on the one hand and the last named controlling means on the other.

In testimony whereof I have signed my name to this specification.

BRUNO V. E. NORDBERG.